US012460652B2

(12) United States Patent
Yazawa et al.

(10) Patent No.: US 12,460,652 B2
(45) Date of Patent: Nov. 4, 2025

(54) PUMP DEVICE AND METHOD OF MANUFACTURING THE SAME

(71) Applicant: NIDEC INSTRUMENTS CORPORATION, Nagano (JP)

(72) Inventors: Takehiko Yazawa, Nagano (JP); Takashi Yamamoto, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 99 days.

(21) Appl. No.: 18/510,571

(22) Filed: Nov. 15, 2023

(65) Prior Publication Data
US 2024/0175439 A1  May 30, 2024

(30) Foreign Application Priority Data
Nov. 30, 2022  (JP) ................. 2022-191218

(51) Int. Cl.
| F04D 25/06 | (2006.01) |
| F04D 29/60 | (2006.01) |
| H02K 5/04 | (2006.01) |
| H02K 15/14 | (2025.01) |
| H02K 21/16 | (2006.01) |

(52) U.S. Cl.
CPC ........... F04D 25/06 (2013.01); F04D 29/601 (2013.01); H02K 5/04 (2013.01); H02K 15/14 (2013.01); H02K 21/16 (2013.01)

(58) Field of Classification Search
CPC .... F04D 25/06; F04D 29/601; F04D 13/0626; F04D 29/628; F04D 13/0606; F04D 29/426; H02K 5/04; H02K 15/14; H02K 21/16; B23K 37/0443

USPC ...................................................... 417/423.14
See application file for complete search history.

(56) References Cited

U.S. PATENT DOCUMENTS

| 6,588,970 B1 * | 7/2003 | Natrop ................... B29C 66/54 |
| | | 403/270 |
| 10,626,872 B2 * | 4/2020 | Vinther Toft ........... F04D 13/16 |
| 2014/0037914 A1 * | 2/2014 | Fujimoto .......... B29C 66/24221 |
| | | 156/272.8 |
| 2017/0146030 A1 * | 5/2017 | Furukawa ............ B23K 26/324 |
| 2017/0302126 A1 * | 10/2017 | Ehrsam .................... H02K 5/22 |

(Continued)

FOREIGN PATENT DOCUMENTS

JP  2018-035719  3/2018

Primary Examiner — Mark A Laurenzi
Assistant Examiner — Benjamin Doyle
(74) Attorney, Agent, or Firm — JCIPRNET

(57) ABSTRACT

In a pump device, a pump chamber is formed by welding a first flange portion of a first housing sealing a stator and a second flange portion of a second housing put on the first housing from one side in an axial direction. Since the second housing is provided with first reinforcement ribs each connecting the second flange portion and a side wall portion, the second flange portion is less likely to be deformed even when a pressurizing force in the axial direction is applied to the second flange portion during welding. As a result, it is possible to prevent a first welding portion provided on the first flange portion and a second welding portion provided on the second flange portion from being welded in a state of being unable to sufficiently contact each other, and thus there is little possibility that defective welding occurs.

7 Claims, 3 Drawing Sheets

(56) References Cited

U.S. PATENT DOCUMENTS

| | | | | |
|---|---|---|---|---|
| 2018/0266435 A1* | 9/2018 | Kumagai | ............ | B29C 65/7814 |
| 2019/0331125 A1* | 10/2019 | Hattori | ................. | F04D 29/086 |
| 2019/0359177 A1* | 11/2019 | Otani | ..................... | F04D 29/42 |
| 2020/0182256 A1* | 6/2020 | Britsch | ................. | F16L 23/02 |
| 2021/0003132 A1* | 1/2021 | Imai | ..................... | F04D 29/628 |
| 2021/0115940 A1* | 4/2021 | Ogawa | ................. | F04D 29/426 |

\* cited by examiner

PUMP DEVICE AND METHOD OF MANUFACTURING THE SAME

CROSS REFERENCE TO RELATED APPLICATION

The present invention claims priority under 35 U.S.C. § 119 to Japanese Application No. 2022-191218 filed Nov. 30, 2022, and the entire content of which is incorporated herein by reference.

TECHNICAL FIELD

At least an embodiment of the present invention relates to a pump device in which an impeller is rotated by a motor, and a method of manufacturing the same.

BACKGROUND

Japanese Unexamined Patent Publication No. 2018-035719 describes a pump device in which an impeller disposed in a pump chamber is rotated by a motor. The pump device of Japanese Unexamined Patent Publication No. 2018-035719 includes a first housing made of resin that covers a stator, and a second housing that is put on the first housing from one side in a rotation axis direction of the motor to form a pump chamber between the first housing and the second housing. The second housing includes a suction tubular portion extending in an axial direction from a radial center of the pump chamber, and a discharge tubular portion extending in a tangential direction from an outer periphery of the pump chamber.

A first flange portion is provided at an end portion of the first housing on a pump chamber side. The first flange portion is formed with an annular first welding portion centered on the rotation axis of the motor. The second housing includes a second flange portion opposed to the first flange portion, and the second flange portion is provided with a second welding portion joined to the first welding portion by welding.

In the pump device of Japanese Unexamined Patent Publication No. 2018-035719, when the first housing and the second housing are fixed to each other by welding, welding places are pressurized. Therefore, the flange portions may be deformed by the pressurization, and the welding places may be defectively welded. For example, when the second flange portion is pressurized toward the first flange portion, an outer peripheral end portion of the second flange portion may be deformed into a shape inclined toward the first flange portion. In this case, the outer peripheral end portion of the first flange portion and the outer peripheral end portion of the second flange portion abut on each other before the welding places abut on each other. As a result, there is a risk of insufficient welding due to a gap forming between the welding places.

In view of the above-described problems, an object of at least an embodiment of the present invention is to suppress defective welding at welding places in a pump device in which flange portions of a housing are welded to each other to form a pump chamber.

SUMMARY

In order to solve the above problem, a pump device of at least an embodiment of the present invention includes a motor that includes a rotor and a stator having an annular shape surrounding an outer periphery of the rotor; a first housing that seals the stator; a second housing that is put on the first housing from one side in an axial direction along a rotation axis of the rotor to form a pump chamber between the first housing and the second housing; and an impeller that is disposed in the pump chamber and rotates integrally with the rotor, wherein the first housing includes a first partition wall portion that covers the stator on the one side in the axial direction, and a first flange portion having an annular shape that is disposed on an outer peripheral side of the stator, the first flange portion is provided with a first welding portion on a surface thereof facing the one side in the axial direction, the second housing includes an end plate portion that is opposed to the first partition wall portion from the one side in the axial direction, a side wall portion that extends from an outer peripheral edge of the end plate portion toward another side in the axial direction, a second flange portion having an annular shape that protrudes from the side wall portion toward an outer peripheral side, a first tubular portion that extends from a center of the end plate portion toward the one side in the axial direction, and a second tubular portion that extends from the side wall portion toward a direction intersecting the axial direction, the second flange portion is provided with a second welding portion that is welded to the first welding portion on a surface thereof facing the other side in the axial direction, and the second housing is provided with a plurality of first reinforcement ribs respectively provided at a plurality of positions in a circumferential direction, each of the plurality of first reinforcement ribs connecting the side wall portion and the second flange portion.

According to at least an embodiment of the present invention, the pump chamber is formed between the first housing and the second housing by making the first flange portion of the first housing and the second flange portion of the second housing abut on each other in the axial direction and welding abutment places. Since the second housing is provided with the first reinforcement ribs each connecting the second flange portion and the side wall portion, the second flange portion is less likely to be deformed even when a pressurizing force in the axial direction is applied to the second flange portion during welding. As a result, it is possible to prevent the first welding portion and the second welding portion from being welded in a state of being unable to sufficiently contact each other, and thus there is little possibility that defective welding occurs. For example, since the second flange portion is less likely to be deformed into a shape inclined toward the first flange portion by the pressurizing force, it is possible to avoid a situation in which a portion different from the first welding portion and the second welding portion abuts first, and as a result, the first welding portion and the second welding portion are welded in a state of being unable to sufficiently contact each other. Therefore, there is little possibility that defective welding occurs.

In at least an embodiment of the present invention, it is preferable that the plurality of first reinforcement ribs overlaps the second welding portion when viewed from the axial direction. In this way, it is possible to reinforce the place where the first welding portion and the second welding portion are provided, and it is possible to suppress deformation of the place where the first welding portion and the second welding portion are provided. Therefore, defective welding can be suppressed.

In at least an embodiment of the present invention, it is preferable that the plurality of first reinforcement ribs extends to an outer peripheral edge of the second flange portion. In this way, deformation of the outer peripheral end portion, which is a place where the greatest displacement occurs, can be suppressed. Therefore, it is possible to avoid a situation in which the outer peripheral end portion of the first flange portion and the outer peripheral end portion of the second flange portion abut against each other first, and as a result, the first welding portion and the second welding portion are welded in a state of being unable to sufficiently contact each other. Therefore, there is little possibility that defective welding occurs.

In at least an embodiment of the present invention, it is preferable that the second housing is provided with a plurality of gate marks at different positions in the circumferential direction, and a middle angular position between the gate marks adjacent to each other in the circumferential direction coincides with an angular position of one of the plurality of first reinforcement ribs. In this way, since the angular position of a weld line formed in the middle of the gate marks adjacent to each other in the circumferential direction coincides with the angular position of the reinforcement rib, it is possible to suppress a decrease in strength of a portion where the weld line is formed.

In at least an embodiment of the present invention, it is preferable that a plurality of second reinforcement ribs is respectively provided at a plurality of positions in the circumferential direction at a place where the first tubular portion and the end plate portion are connected, each of the plurality of second reinforcement ribs connecting the first tubular portion and the end plate portion. In this way, the connection place between the first tubular portion and the end plate portion can be reinforced, and the second reinforcement rib can be used as a positioning shape when a tubular member (that is, a supply pipe for supplying a fluid to the pump chamber) connected to the first tubular portion is positioned with respect to the first tubular portion.

In at least an embodiment of the present invention, it is preferable that the second housing includes a plurality of support portions that protrudes from an inner peripheral surface of the first tubular portion and extends toward the other side in the axial direction, and a shaft support portion that is provided at distal ends of the plurality of support portions, an end portion on the one side in the axial direction of a support shaft that rotatably supports the rotor is supported by the shaft support portion, and circumferential positions of the plurality of support portions are different from those of the plurality of second reinforcement ribs. In this way, molding defects such as sink marks and voids can be suppressed during manufacturing.

In at least an embodiment of the present invention, it is preferable that a shape of the side wall portion viewed from the axial direction is a shape that expands radially outward toward one side in the circumferential direction, the second tubular portion extends from a first angular position at which a distance from the rotation axis to the side wall portion is maximum toward a tangential direction of the side wall portion at the first angular position, an outer shape of the second flange portion is a circular shape centered on the rotation axis, and the plurality of first reinforcement ribs respectively extends from an outer peripheral surface of the side wall portion to an outer peripheral edge of the second flange portion at the plurality of positions in the circumferential direction. In this way, the pump chamber can be formed into a shape in which the inner diameter increases toward the second tubular portion. Further, since the first reinforcement ribs extend to the outer peripheral edge of the second flange portion at any angular position in the circumferential direction, the entire second flange portion can be reinforced.

In at least an embodiment of the present invention, it is preferable that the first housing includes an attachment portion provided with an attachment surface that abuts on a mating member for attachment. In a case where the first housing is provided with the attachment surface that abuts on a mating member when the pump device is installed, the orientation of the second tubular portion is required to be accurately aligned with the attachment surface by precisely positioning and welding the second housing to the first housing. However, in at least an embodiment of the present invention, since the first reinforcement ribs are provided at the positions far from the center in the radial direction of the second housing, the second housing is positioned in the circumferential direction by using the first reinforcement rib, whereby the orientation of the second tubular portion can be accurately aligned with respect to the attachment surface. Thus, when the pump device is installed, a variation in the orientation of the second tubular portion can be suppressed.

Next, at least an embodiment of the present invention provides a method of manufacturing the above-described pump device, the method including the steps of: positioning the first housing on a first jig via the attachment portion, and positioning the second housing on a second jig by fitting at least one of the plurality of first reinforcement ribs into a groove provided in the second jig; and welding the first welding portion and the second welding portion after aligning relative rotational positions of the first housing and the second housing about the rotation axis via the first jig and the second jig.

According to at least an embodiment of the present invention, when the second housing is positioned with respect to the second jig, the second housing is positioned by fitting the first reinforcement rib provided at a position far from the center in the radial direction of the second housing into the groove of the second jig. In this way, even when the width of the groove of the second jig is set to be slightly larger than the width of the first reinforcement rib so that the first reinforcement rib can be reliably fitted into the groove, it is possible to reduce the variation in the orientation of the second tubular portion caused by the movement of the first reinforcement rib in the width direction in the groove of the second jig. Therefore, when the relative rotational positions of the first housing and the second housing about the rotation axis are aligned via the first jig and the second jig such that the angle (port angle) of the center line of the second tubular portion with respect to the attachment surface becomes a predetermined angle, the relative rotational positions can be accurately aligned. As a result, the pump device can be installed with the orientation of the second tubular portion accurately positioned.

According to at least an embodiment of the present invention, the pump chamber is formed between the first housing and the second housing by making the first flange portion of the first housing and the second flange portion of the second housing abut on each other in the axial direction and welding abutment places. Since the second housing is provided with the first reinforcement ribs each connecting the second flange portion and the side wall portion, the second flange portion is less likely to be deformed even when a pressurizing force in the axial direction is applied to the second flange portion during welding. As a result, it is possible to prevent the first welding portion and the second welding portion from being welded in a state of being unable to sufficiently contact each other, and thus there is little possibility that defective welding occurs. For example, since the second flange portion is less likely to be deformed into a shape inclined toward the first flange portion by the pressurizing force, it is possible to avoid a situation in which a portion different from the first welding portion and the second welding portion abuts first, and as a result, the first welding portion and the second welding portion are welded in a state of being unable to sufficiently contact each other. Therefore, there is little possibility that defective welding occurs.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, a pump device 1 according to at least an embodiment of the present invention will be described with reference to the drawings. In the following description, an axial direction means a direction in which a rotation axis L of a motor 10 extends, a radial direction on an inner side in the radial direction and an outer side in the radial direction means a radial direction with the rotation axis L being a center, and a circumferential direction means a rotational direction with the rotation axis L being a center.

Overall Configuration

Figure 1:
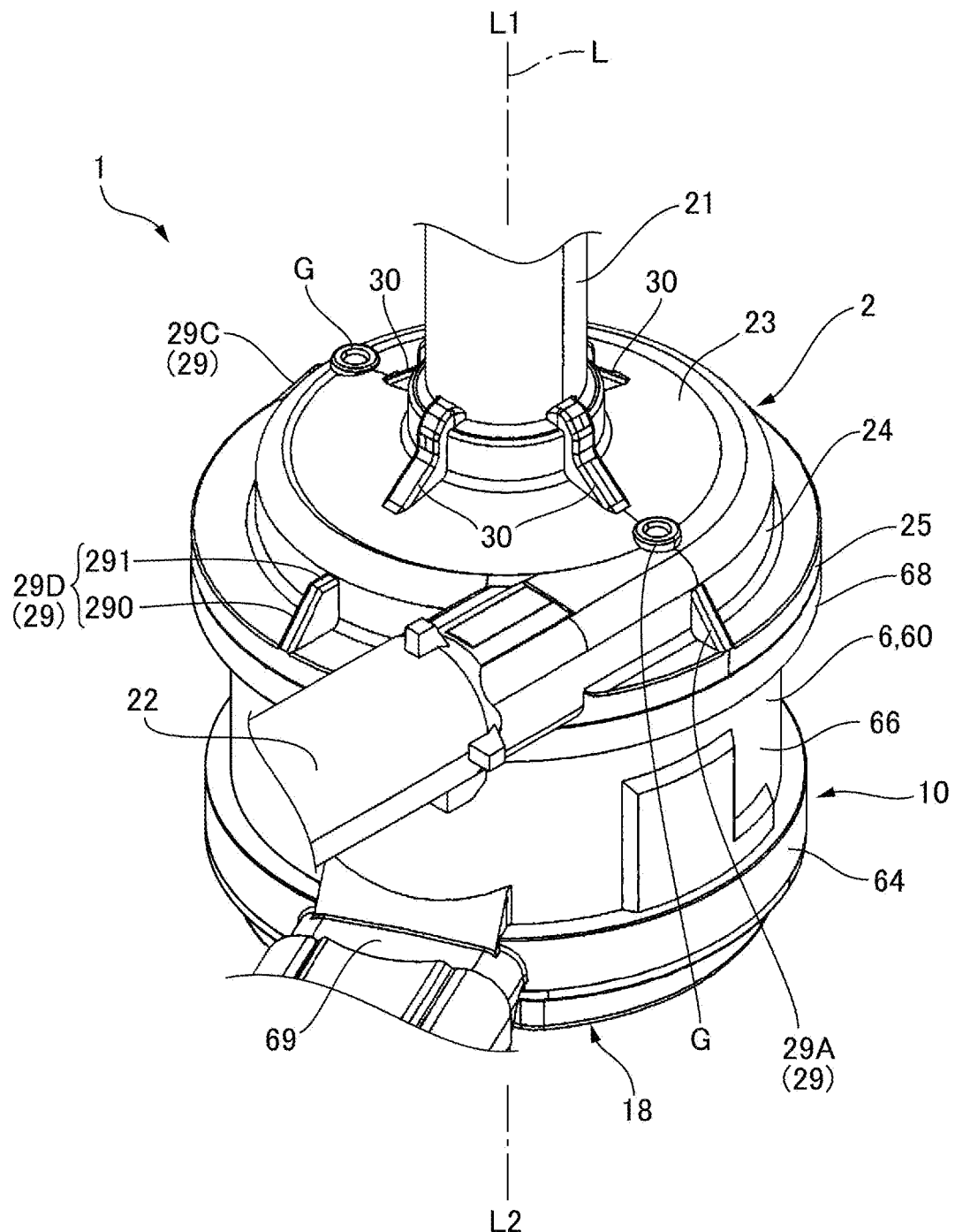
FIG. 1 is an external perspective view of a pump device to which at least an embodiment of the present invention is applied.
Figure 2:
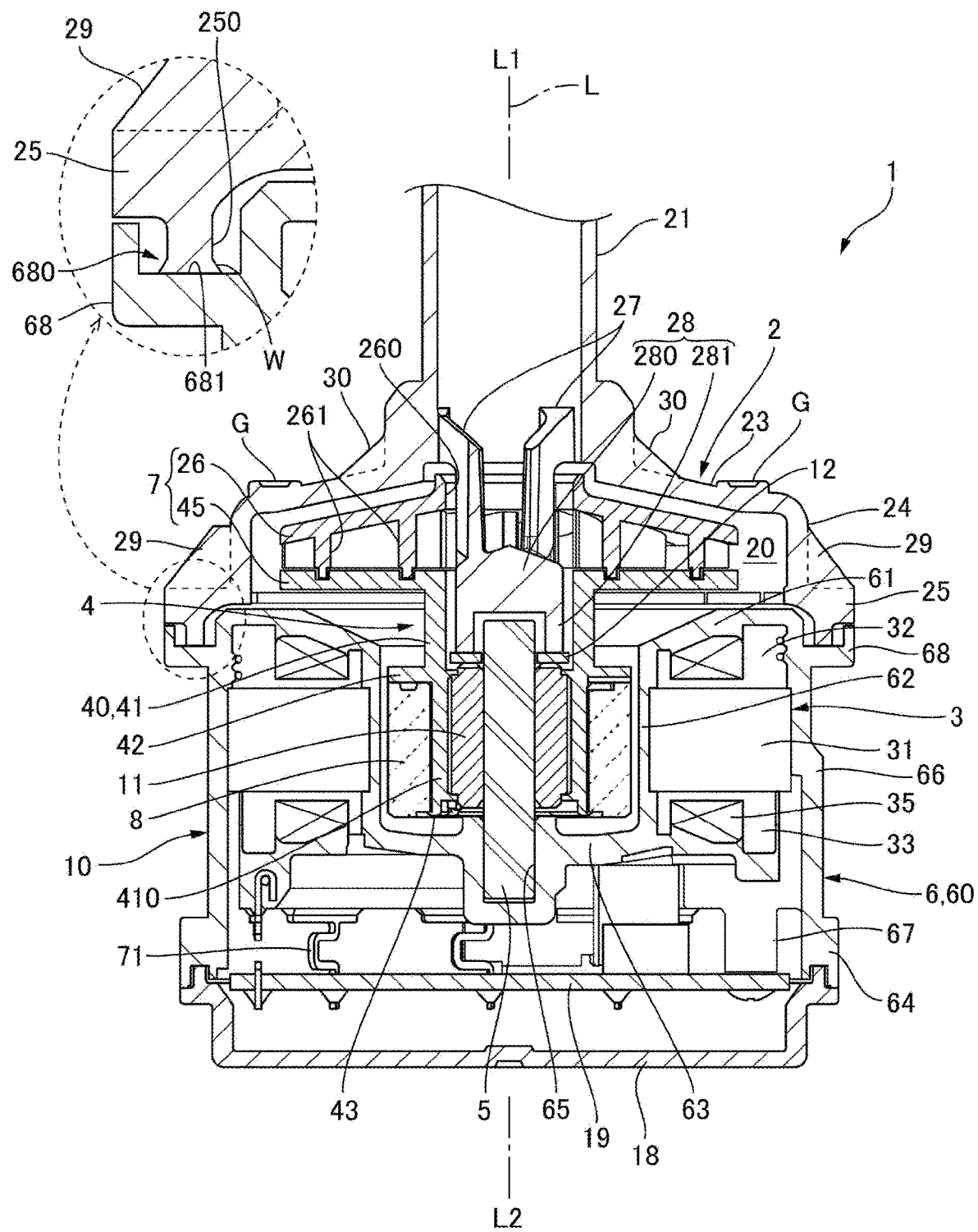
FIG. 2 is a sectional view of the pump device shown in FIG. 1 taken along a plane including a rotation axis (sectional view taken along a line A-A in FIG. 3)
Figure 3:
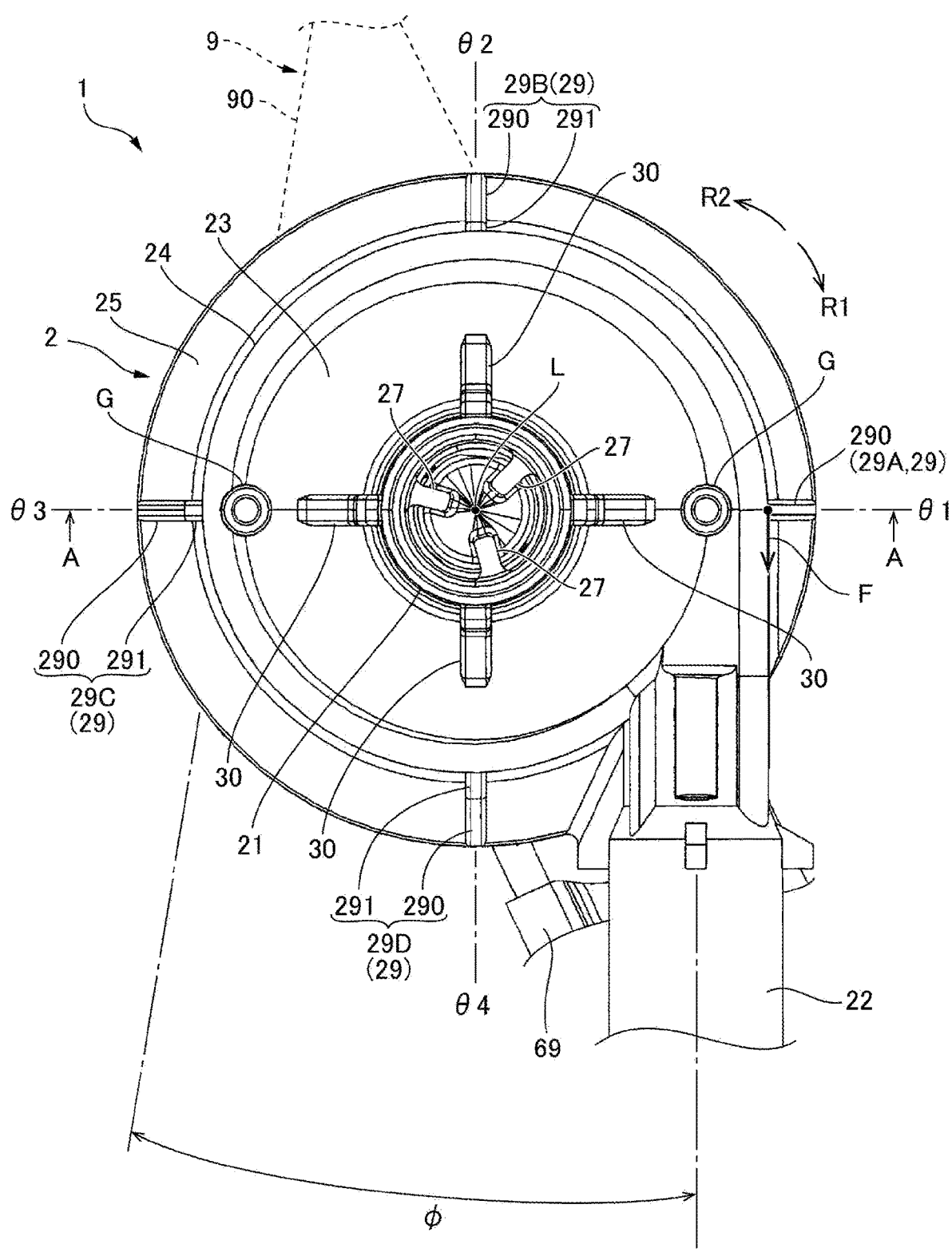
FIG. 3 is a plan view of the pump device shown in FIG. 1 as viewed from one side in an axial direction.

FIG. 1 is an external perspective view of the pump device 1 to which at least an embodiment of the present invention is applied. FIG. 2 is a sectional view of the pump device 1 shown in FIG. 1 taken along a plane including the rotation axis L, and is a sectional view taken along a line A-A in FIG. 3. FIG. 3 is a plan view of the pump device 1 shown in FIG. 1 as viewed from the one side L1 in the axial direction. As shown in FIGS. 1 and 2, the pump device 1 includes the motor 10 having a stator 3 covered by a resin-made first housing 6, a resin-made second housing 2 put on the motor 10 from the one side L1 in the axial direction, and an impeller 7 disposed in a pump chamber 20 provided between the first housing 6 and the second housing 2.

In the pump device 1 of the present embodiment, the fluid flowing through the pump chamber 20 is a liquid. The pump device 1 is used, for example, under a condition in which an environmental temperature or a fluid temperature is likely to change. The second housing 2 includes a suction pipe 21 (first tubular portion) extending along the rotation axis L of the motor 10, and a discharge pipe 22 (second tubular portion) extending in a direction orthogonal to the rotation axis L of the motor 10. The suction pipe 21 is connected to a center in the radial direction of the pump chamber 20, and the discharge pipe 22 is connected to an outer peripheral portion of the pump chamber 20. The impeller 7 is rotationally driven around the rotation axis L by the motor 10.

The motor 10 includes the stator 3 having an annular shape, a rotor 4 disposed inside the stator 3, a support shaft 5 that rotatably supports the rotor 4, and the first housing 6 that seals the stator 3. The support shaft 5 is made of metal or ceramic. The rotor 4 rotates integrally with the impeller 7. The first housing 6 is a resin sealing member 60 that covers the stator 3 from both sides in the radial direction and both sides in the axial direction. The resin sealing member 60 is made of polyphenylene sulfide (PPS). The stator 3 is integrated with the resin sealing member 60 by insert molding.

The first housing 6 (resin sealing member 60) is a partition wall member including a first partition wall portion 61 opposed to an end plate portion 23 on the one side L1 in the axial direction of the pump chamber 20, a second partition wall portion 62 interposed between the stator 3 and a drive magnet 8, and a bottom wall 63 provided at an end on another side L2 of the second partition wall portion 62. In addition, the first housing 6 includes a cylindrical trunk portion 66 that covers the stator 3 from the outer side in the radial direction, and a first flange portion 68 that expands, on an outer peripheral side of the stator 3, radially outward from a trunk portion 66. The first flange portion 68 is disposed at an end portion on the one side L1 in the axial direction of the resin sealing member 60.

The second housing 2 includes the end plate portion 23 opposed to the first partition wall portion 61 from the one side L1 in the axial direction, a side wall portion 24 which extends from an outer peripheral edge of the end plate portion 23 to the other side L2 in the axial direction, and a second flange portion 25 which expands from an end portion on the other side L2 in the axial direction of the side wall portion 24 to an outer peripheral side. The end plate portion 23 constitutes a wall surface on the one side L1 in the axial direction of the pump chamber 20, and the side wall portion 24 constitutes a wall surface on the outer peripheral side of the pump chamber 20. The suction pipe 21 protrudes from a center in the radial direction of the end plate portion 23 toward the one side L1 in the axial direction. The discharge pipe 22 extends from the side wall portion 24 in a tangential direction of the side wall portion 24. The second flange portion 25 overlaps the first flange portion 68 from the one side L1 in the axial direction. As described below, the first flange portion 68 and the second flange portion 25 are joined together by vibration welding.

As shown in FIG. 2, the stator 3 includes a stator core 31, an insulator 32 overlapping the stator core 31 from the one side L1 in the axial direction, an insulator 33 overlapping the stator core 31 from the other side L2 in the axial direction, and a plurality of coils 35 wound around a plurality of salient poles provided in the stator core 31 via the insulators 32 and 33. The motor 10 is a three-phase motor. Therefore, the plurality of coils 35 are constituted by a U-phase coil, a V-phase coil, and a W-phase coil.

The rotor 4 includes a rotor member 40 made of resin. The rotor member 40 includes a cylindrical portion 41 extending in the axial direction. The cylindrical portion 41 extends from an inner side in the radial direction of the stator 3 toward the pump chamber 20 and opens at the pump chamber 20. The drive magnet 8 having a cylindrical shape is held on an outer peripheral surface of the cylindrical portion 41. The drive magnet 8 is opposed to the stator 3 on the inner side in the radial direction. The drive magnet 8 is formed of, for example, a neodymium bond magnet.

The rotor member 40 includes an annular seat portion 42 protruding radially outward from the cylindrical portion 41 at a position spaced apart from a flange portion 45 on the other side L2. The cylindrical portion 41 includes a magnet holding portion 410 that extends from the seat portion 42 toward the other side L2. The magnet holding portion 410 is fitted inside the cylindrical drive magnet 8 to hold the drive magnet 8. At this time, the seat portion 42 supports an end portion on the one side L1 in the axial direction of the drive magnet 8. A caulking portion 43 that overlaps the drive magnet 8 in the axial direction is formed at an end portion of the magnet holding portion 410 on a side opposite to the seat portion 42 in the axial direction (on the other side L2 in the axial direction).

In the rotor member 40, the flange portion 45 having a disc shape is formed at an end portion on the one side L1 in the axial direction of the cylindrical portion 41, and a vane wheel 26 is coupled to the flange portion 45 from the one side L1 in the axial direction. A central hole 260 is formed at a center of the vane wheel 26. On a surface of the vane wheel 26 opposed to the flange portion 45, a plurality of blade portions 261 extending to the outer side in the radial direction while being curved in an arc shape from the periphery of the central hole 260 are formed at equal angular intervals, and the vane wheel 26 is fixed to the flange portion 45 via the blade portions 261. Therefore, the impeller 7 connected to the cylindrical portion 41 of the rotor member 40 is constituted by the flange portion 45 and the vane wheel 26. In this embodiment, the vane wheel 26 is inclined in a direction toward the flange portion 45 as it extends to the outer side in the radial direction.

In the rotor member 40, a cylindrical radial bearing 11 is held on an inner side in the radial direction of the cylindrical portion 41. The rotor 4 is rotatably supported by the support shaft 5 via the radial bearing 11. An end portion on the other side L2 in the axial direction of the support shaft 5 is held in a shaft hole 65 formed in the bottom wall 63 of the first housing 6. An end portion on the one side L1 in the axial direction of the support shaft 5 is held by a shaft support portion 28 formed in the second housing 2. The shaft support portion 28 includes a tubular portion 280 into which the support shaft 5 is fitted, and a receiving portion 281 provided at an end portion on the one side L1 in the axial direction of the tubular portion 280. The receiving portion 281 is opposed, on the pump chamber 20 side, to the end portion on the one side L1 in the axial direction of the support shaft 5 to limit a movable range of the support shaft 5 to the pump chamber 20 side. The shaft support portion 28 is provided at distal ends of three support portions 27 that extends from an inner peripheral surface of the suction pipe 21 in the second housing 2 to the other side L2 in the axial direction.

An annular thrust bearing 12 is mounted on the end portion on the one side L1 in the axial direction of the support shaft 5, and the thrust bearing 12 is disposed between the radial bearing 11 and the tubular portion 280. Here, at least a part of the end portion on the other side L2 of the support shaft 5 and the shaft hole 65 has a D-shaped cross section. Further, the end portion on the one side L1 of the support shaft 5 and the hole of the thrust bearing 12 each have a D-shaped cross section. Therefore, rotation of the support shaft 5 and the thrust bearing 12 with respect to the first housing 6 and the second housing 2 is prevented.

As shown in FIGS. 1 and 2, a cover 18 is fixed to an end portion 64 on the other side L2 in the axial direction of the first housing 6 from the other side L2 in the axial direction. As shown in FIG. 2, a substrate 19 provided with a circuit for controlling power supply to the coils 35 is disposed between the cover 18 and the bottom wall 63 of the first housing 6. Metal winding terminals 71, which extend from the stator 3 through the bottom wall 63 of the first housing 6 and protrude to the other side L2 in the axial direction, are connected to the substrate 19 by soldering.

The first housing 6 includes a first columnar portion 67 that protrudes from the bottom wall 63 to the other side L2 in the axial direction, and a second columnar portion (not shown) that protrudes from the bottom wall 63 to the other side L2 in the axial direction at a position spaced apart from the first columnar portion 67 in the circumferential direction. The substrate 19 is fixed to the first columnar portion 67 and the second columnar portion (not shown) by screws.

As shown in FIG. 1, the first housing 6 includes a tubular connector housing 69 extending radially outward from the trunk portion 66 surrounding the outer peripheral side of the stator 3. A connector terminal whose one end is connected to the substrate 19 is disposed inside the connector housing 69. When a connector is coupled to the connector housing 69, a drive current generated by a circuit mounted on the substrate 19 is supplied to each coil 35 via the winding terminal 71. As a result, the rotor 4 rotates around the rotation axis L of the motor 10. In this way, the impeller 7 rotates in the pump chamber 20 and a negative pressure is generated in the pump chamber 20. Thus, the fluid is suctioned into the pump chamber 20 from the suction pipe 21 and is discharged from the discharge pipe 22.

Welding Portion

As shown in FIG. 2, the first flange portion 68 is provided with a first welding portion 680 on a surface thereof facing the one side L1 in the axial direction, and the second flange portion 25 is provided with a second welding portion 250 on a surface thereof facing the other side L2 in the axial direction. As shown in FIG. 2, the first welding portion 680 is an annular groove centered on the rotation axis L. The second welding portion 250 is an annular welding projection centered on the rotation axis L. The first welding portion 680 may be a convex portion, and the second welding portion 250 may be a groove.

When the second flange portion 25 and the first flange portion 68 are welded by vibration welding, the second flange portion 25 and the first flange portion 68 are overlapped in the axial direction, and the second flange portion 25 is pressurized from the one side L1 in the axial direction. As shown in FIG. 2, the height of the second welding portion 250 (welding projection) in the axial direction is larger than the depth of the first welding portion 680 (annular groove). Therefore, a distal end of the second welding portion 250 (the welding projection) inserted into the first welding portion 680 (the annular groove) is crushed by a bottom surface 681 of the first welding portion 680, whereby a welding portion W welded to the bottom surface 681 is formed at the distal end of the second welding portion 250. The radial thickness of the second welding portion 250 (welding projection) is smaller than the width of the first welding portion 680 (annular groove). Therefore, a gap capable of accommodating the welding burr is secured around the second welding portion 250 inserted into the first welding portion 680.

First Reinforcement Rib

As shown in FIGS. 1 and 3, the second housing 2 includes a plurality of first reinforcement ribs 29 respectively provided at a plurality of positions in the circumferential direction, and each first reinforcement rib 29 connects the side wall portion 24 and the second flange portion 25. The first reinforcement rib 29 protrudes radially outward from an outer peripheral surface of the side wall portion 24, and is connected to a surface on the one side L1 in the axial direction of the second flange portion 25. The plurality of first reinforcement ribs 29 are arranged at equal angular intervals. As shown in FIG. 3, in this embodiment, the first reinforcement ribs 29 are arranged at four places at angular intervals of 90°. The first reinforcement ribs 29 extend to the outer peripheral edge of the second flange portion 25 and overlap the second welding portion 250 and the first welding portion 680 when viewed from the axial direction.

As shown in FIG. 3, the side wall portion 24 of the second housing 2 does not have a circular shape centered on the rotation axis L when viewed in the axial direction, but has a curved shape in which the distances from the rotation axis L increase toward one side R1 in the circumferential direction. When an angular position at which the distance from the rotation axis L of the side wall portion 24 is maximized is defined as a first angular position θ1, the discharge pipe 22 (second tubular portion) extends in a tangential direction F of the side wall portion 24 at the first angular position θ1.

As described above, the distance from the rotation axis L to the side wall portion 24 varies depending on the position in the circumferential direction, whereas the outer shape of the second flange portion 25 is a circular shape centered on the rotation axis L. Therefore, the radial length of the first reinforcement rib 29 varies depending on its position in the circumferential direction. In the present specification, as illustrated in FIG. 3, among the plurality of first reinforcement ribs 29, the first reinforcement rib 29 provided at the first angular position θ1 to which the discharge pipe 22 is connected is denoted by a reference sign 29A. In addition, the first reinforcement ribs 29 provided at three places of a second angular position θ2 rotated by 90° from the first angular position θ1 to another side R2 in the circumferential direction, a third angular position θ3 rotated by 180°, and a fourth angular position θ4 rotated by 270° are denoted by reference signs 29B, 29C, and 29D, respectively. The radial length of the first reinforcement rib 29A provided at the first angular position θ1 is the shortest, and the radial lengths of the first reinforcement ribs 29B, 29C, and 29D increase in that order.

As shown in FIG. 1, the first reinforcement rib 29A provided at the first angular position θ1 has a shape formed only by an inclined portion 290 whose height in the axial direction decreases toward the radially outer side, whereas each of the other three first reinforcement ribs 29B, 29C, 29D has a shape in which a flat portion 291 having a constant height in the axial direction is connected to the radially inner side of the inclined portion 290. The radial lengths of the flat portions 291 increase in the order of the first reinforcement ribs 29B, 29C, and 29D.

Gate Mark

The second housing 2 includes gate marks G formed at positions where the resin material is injected during molding. The gate marks G are arranged at equal intervals in the circumferential direction in the end plate portion 23. In this embodiment, the gate marks G are provided at two places on opposite sides in the radial direction with the suction pipe 21 interposed therebetween. The angular positions at which the gate marks G are formed coincide with the angular positions (the first angular position θ1 and the third angular position θ3) at which the first reinforcement ribs 29A and 29C are formed. The first reinforcement ribs 29B and 29D at the other two places are formed at middle angular positions between the gate marks G adjacent to each other in the circumferential direction.

When the second housing 2 is manufactured, a weld line is formed at a middle angular position between the gate marks G adjacent to each other in the circumferential direction in a region on a side opposite to a side where the discharge pipe 22 extends in the radial direction. Therefore, the first reinforcement rib 29B is provided at an angular position that coincides with the weld line. On the other hand, in the region on the side where the discharge pipe 22 extends, the position of the weld line is a position shifted to the third angular position θ3 side (i.e., the side away from the discharge pipe 22) from the fourth angular position θ4 which is the middle angular position between the two gate marks G. Therefore, the angular position of the first reinforcement rib 29D is close to the angular position of the weld line, but does not coincide with the angular position of the weld line.

Second Reinforcement Rib

As shown in FIG. 1, the second housing 2 includes a plurality of second reinforcement ribs 30 respectively provided at a plurality of positions in the circumferential direction, and each second reinforcement rib 30 connects the suction pipe 21 and the end plate portion 23. The second reinforcement rib 30 protrudes radially outward from an outer peripheral surface of the suction pipe 21, and is connected to a surface on the one side L1 in the axial direction of the end plate portion 23. The plurality of second reinforcement ribs 30 are arranged at equal angular intervals. As shown in FIG. 3, in this embodiment, the second reinforcement ribs 30 are arranged at four places at angular intervals of 90°. The angular positions at which the second reinforcement ribs 30 are formed coincide with the angular positions at which the first reinforcement ribs 29 are formed.

As shown in FIG. 3, a plurality of support portions 27 protrude radially inward from an inner peripheral surface of the suction pipe 21 (first tubular portion). As shown in FIG. 2, the shaft support portion 28 for supporting a distal end of the support shaft 5 is connected to distal ends of the plurality of support portions 27. In this embodiment, three support portions 27 are disposed at equal angular intervals, and all of the four second reinforcement ribs 30 are disposed at angular positions different from those of the support portions 27.

Positioning of First Housing and Second Housing

As shown in FIG. 3, the pump device 1 includes an attachment portion 9 provided at an angular position different from that of the discharge pipe 22. In FIGS. 1 and 2, the attachment portion 9 is not shown. The attachment portion 9 is formed integrally with the first housing 6. When the pump device 1 is installed, an attachment surface 90 provided on the attachment portion 9 is fixed by abutting on a mating member.

In this embodiment, when the first housing 6 and the second housing 2 are joined by vibration welding, the first housing 6 and the second housing 2 are welded after being positioned such that an angle φ (port angle) of a center line of the discharge pipe 22 with respect to the attachment surface 90 becomes a predetermined target angle. For example, the following steps (1) to (3) are performed.

(1) The first housing 6 is positioned on a first jig (not shown) via the attachment portion 9, and at least one of the plurality of first reinforcement ribs 29 is fitted into a groove provided in a second jig (not shown), whereby the second housing is positioned on the second jig.

(2) The second housing 2 is put on the first housing 6 from the one side L1 in the axial direction, the second flange portion 25 is superposed on the first flange portion 68, and the second welding portion 250 is inserted into the first welding portion 680. At this time, the relative rotational positions of the first housing 6 and the second housing 2 about the rotation axis L are aligned by positioning the second jig with respect to the first jig. The first jig and the second jig are designed such that the relative rotational position between the first housing 6 and the second housing 2 can be adjusted to a position at which the angle φ of the center line of the discharge pipe 22 with respect to the attachment surface 90 becomes a target angle.

(3) After the positioning of (2) is completed, the second flange portion 25 is pressurized from the one side L1 in the axial direction toward the first flange portion 68, and the first welding portion 680 and the second welding portion 250 are welded.

Main Effects of Present Embodiment

As described above, the pump device 1 of the present embodiment includes the motor including the rotor 4 and the annular stator 3 surrounding the outer periphery of the rotor 4, the first housing 6 sealing the stator 3, the second housing 2 put on the first housing 6 from the one side L1 in the axial direction along the rotation axis L of the rotor 4 to form the pump chamber 20 between the first housing 6 and the second housing 2, and the impeller disposed in the pump chamber 20 and rotates integrally with the rotor 4. The first housing 6 includes the first partition wall portion 61 that covers the stator 3 on the one side L1 in the axial direction, the trunk portion 66 that covers the outer periphery of the stator 3, and the annular first flange portion 68 that protrudes from the trunk portion 66 toward the outer peripheral side. The first flange portion 68 is provided with the first welding portion 680 on the surface thereof facing the one side L1 in the axial direction. The second housing 2 includes the end plate portion 23 that is opposed to the first partition wall portion 61 from the one side L1 in the axial direction, the side wall portion 24 that extends from the outer peripheral edge of the end plate portion 23 toward the other side L2 in the axial direction, the annular second flange portion 25 that protrudes from the side wall portion 24 toward the outer peripheral side, the suction pipe 21, which is the first tubular portion that extends from the center of the end plate portion 23 to the one side L1 in the axial direction, and the discharge pipe 22, which is the second tubular portion that extends from the side wall portion 24 toward a direction intersecting the axial direction. The second flange portion 25 is provided with the second welding portion 250 that is welded to the first welding portion 680 on the surface thereof facing the other side L2 in the axial direction. The second housing 2 is provided with the plurality of first reinforcement ribs 29 respectively provided at a plurality of positions in a circumferential direction, and each first reinforcement rib 29 connects the side wall portion 24 and the second flange portion 25.

In the pump device 1 of the present embodiment, the pump chamber 20 is formed between the first housing 6 and the second housing 2 by making the first flange portion 68 of the first housing 6 and the second flange portion 25 of the second housing 2 abut on each other in the axial direction and welding abutment places. Since the second housing 2 is provided with the first reinforcement ribs 29 each connecting the second flange portion 25 and the side wall portion 24, the second flange portion 25 is less likely to be deformed even when a pressurizing force in the axial direction is applied to the second flange portion 25 during welding. As a result, it is possible to prevent the first welding portion 680 and the second welding portion 250 from being welded in a state of being unable to sufficiently contact each other, and thus there is little possibility that defective welding occurs. For example, since the second flange portion 25 is less likely to be deformed into a shape inclined toward the first flange portion 68 by the pressurizing force, it is possible to avoid a situation in which a portion different from the first welding portion 680 and the second welding portion 250 abuts first, and as a result, the first welding portion 680 and the second welding portion 250 are welded in a state of being unable to sufficiently contact each other. Therefore, there is little possibility that defective welding occurs.

In this embodiment, the first reinforcement ribs 29 are provided at four places at equal angular intervals, but the number of the first reinforcement ribs 29 may be a number different from four. Further, the first reinforcement ribs 29 may not be arranged at equal angular intervals. For example, the position of the first reinforcement rib 29 may be shifted in the vicinity of the discharge pipe 22.

In this embodiment, the plurality of first reinforcement ribs 29 overlap the second welding portion 250 when viewed from the axial direction. Therefore, it is possible to reinforce the place where the first welding portion 680 and the second welding portion 250 are provided, and it is possible to suppress deformation of the place where the first welding portion 680 and the second welding portion 250 are provided. Therefore, defective welding can be suppressed.

In this embodiment, the plurality of first reinforcement ribs 29 extend to the outer peripheral edge of the second flange portion 25. Therefore, deformation of the outer peripheral end portion, which is a place where the greatest displacement occurs, can be suppressed. Therefore, it is possible to avoid a situation in which the outer peripheral end portion of the first flange portion 68 and the outer peripheral end portion of the second flange portion 25 abut against each other first, and as a result, the first welding portion 680 and the second welding portion 250 are welded in a state of being unable to sufficiently contact each other. Therefore, there is little possibility that defective welding occurs. The first reinforcement rib 29 may have a shape in which the length in the radial direction is shorter than that in this embodiment, and the outer peripheral end portion of the first reinforcement rib 29 may have a shape in which the outer peripheral end portion is positioned on the inner peripheral side of the outer peripheral edge of the second flange portion 25. Even when the radial length of the first reinforcement rib 29 is shorter than that in this embodiment, the effect of suppressing the deformation of the second flange portion 25 can be obtained, and hence the effect of suppressing the defective welding can be obtained.

In this embodiment, the second housing 2 is provided with a plurality of gate marks G at different positions in the circumferential direction, and the second angular position $\theta 2$, which is a middle angular position between the gate marks G adjacent to each other in the circumferential direction, coincides with the angular position of the first reinforcement rib 29B. Therefore, since the place where the weld line is formed can be reinforced by the first reinforcement rib 29B at the second angular position $\theta 2$, it is possible to suppress a decrease in strength of the place where the weld line is formed. The angular position where another weld line is formed does not coincide with the angular position of the first reinforcement rib 29D, but is close to the first reinforcement rib 29D. Thus, the first reinforcement rib 29D can reinforce the vicinity of the place where the weld line is formed. Therefore, a decrease in the strength of the second housing 2 can be suppressed.

In this embodiment, the plurality of second reinforcement ribs 30 are respectively provided at a plurality of positions in the circumferential direction, and each second reinforcement rib 30 connects the suction pipe 21 and the end plate portion 23. Therefore, the connection place between the suction pipe 21 and the end plate portion 23 can be reinforced, and the second reinforcement rib 30 can be used as a positioning shape when a tubular member (that is, a supply pipe for supplying a fluid to the pump chamber 20) connected to the suction pipe 21 is positioned with respect to the suction pipe 21.

Similarly to the first reinforcement ribs 29, the number of the second reinforcement ribs 30 may be a number different from four, and the second reinforcement ribs 30 may not be arranged at equal angular intervals. In addition, the angular positions where the second reinforcement ribs 30 are provided may be different from the angular positions where the first reinforcement rib 29 are provided. Alternatively, the second reinforcement ribs 30 may be omitted.

In this embodiment, the second housing 2 includes the plurality of support portions 27 that protrude from the inner peripheral surface of the suction pipe 21 (first tubular portion) and extend toward the other side L2 in the axial direction, and the shaft support portion 28 that is provided at the distal ends of the plurality of support portions 27, the end portion on the one side L1 in the axial direction of the support shaft 5 that rotatably supports the rotor 4 is supported by the shaft support portion 28. The positions of the support portions 27 are different from those of the second reinforcement ribs 30 in the circumferential direction. As described above, when the support portions 27 are provided on the inner peripheral surface of the suction pipe 21, the positions of the support portions 27 and the second reinforcement ribs 30 in the circumferential direction are shifted from each other, so that molding defects such as sink marks and voids are less likely to occur.

In the present embodiment, the shape of the side wall portion 24 viewed from the axial direction is a shape that expands radially outward toward one side in the circumferential direction, and the discharge pipe 22 (second tubular portion) extends from the first angular position θ1 at which the distance from the rotation axis L to the side wall portion 24 is maximum toward the tangential direction of the side wall portion 24 at the first angular position θ1. Thus, the pump chamber 20 has a shape in which the inner diameter increases toward the discharge pipe 22. On the other hand, the outer shape of the second flange portion 25 is a circular shape centered on the rotation axis L. Therefore, the width of the second flange portion 25 in the radial direction is not constant, but becomes narrower toward the first angular position θ1 side. In this embodiment, the first reinforcement ribs 29 each extends to the outer peripheral edge of the second flange portion 25 at any position in the circumferential direction, and each has a length equal to the width of the second flange portion 25 in the radial direction. Therefore, all of the four first reinforcement ribs 29 can reinforce the entire second flange portion 25.

In this embodiment, the first housing 6 includes the attachment portion 9 provided with the attachment surface 90 that abuts on a mating member for attachment. Conventionally, in a case where the first housing 6 is provided with the attachment surface 90 that abuts on a mating member (installation surface) when the pump device 1 is installed, if the second housing 2 is not accurately positioned and welded to the first housing 6, the variation in the orientation of the discharge pipe 22 (second tubular portion) with respect to the attachment surface 90 increases. As a result, when the pump device 1 is installed, the discharge pipe 22 cannot be accurately oriented in the target direction. In this embodiment, the first reinforcement ribs 29 are provided on the second flange portion 25 at positions far from the center of the second housing 2 in the radial direction. Therefore, by using the first reinforcement ribs 29, it is possible to accurately position the second housing 2 with respect to the first housing 6 in the circumferential direction. Thus, when the pump device is installed, the variation in the orientation of the discharge pipe 22 can be suppressed.

In other words, in the method of manufacturing the pump device 1 of the present embodiment, a step of positioning the first housing 6 on the first jig via the attachment portion 9 and positioning the second housing 2 on the second jig by fitting the first reinforcement rib 29 into the groove provided in the second jig is performed. Thereafter, the relative rotational positions of the first housing 6 and the second housing 2 about the rotation axis L are aligned via the first jig and the second jig, and then a step of welding the first welding portion 680 and the second welding portion 250 is performed.

As described above, in this embodiment, when the second housing 2 is positioned with respect to the second jig, the second housing 2 is positioned by fitting the first reinforcement rib 29 provided at a position far from the center in the radial direction of the second housing into the groove of the second jig. As a result, even when the width of the groove of the second jig is set to be larger than the width of the first reinforcement rib 29 so that the first reinforcement rib 29 can be reliably fitted into the groove, it is possible to reduce the variation in the orientation of the discharge pipe 22 caused by the movement of the first reinforcement rib 29 in the width direction in the groove of the second jig. Therefore, if the first housing 6 and the second housing 2 are then positioned in the circumferential direction via the first jig and the second jig, the angle φ of the center line of the discharge pipe 22 with respect to the attachment surface 90 can be accurately adjusted to the target angle. Therefore, the pump device 1 can be installed such that the variation in the orientation of the discharge pipe 22 is reduced.

What is claimed is:

1. A pump device comprising:
a motor that comprises a rotor and a stator having an annular shape surrounding an outer periphery of the rotor;
a first housing that seals the stator;
a second housing that is put on the first housing from one side in an axial direction along a rotation axis of the rotor to form a pump chamber between the first housing and the second housing; and
an impeller that is disposed in the pump chamber and rotates integrally with the rotor,
wherein
the first housing comprises:
a first partition wall portion that covers the stator on the one side in the axial direction,
a trunk portion that covers an outer periphery of the stator, and
a first flange portion having an annular shape that protrudes from the trunk portion toward an outer peripheral side, the first flange portion is provided with a first welding portion on a surface thereof facing the one side in the axial direction, the second housing comprises:
an end plate portion that is opposed to the first partition wall portion from the one side in the axial direction,
a side wall portion that extends from an outer peripheral edge of the end plate portion toward another side in the axial direction,
a second flange portion having an annular shape that protrudes from the side wall portion toward the outer peripheral side,
a first tubular portion that extends from a center of the end plate portion toward the one side in the axial direction, and
a second tubular portion that extends from the side wall portion toward a direction intersecting the axial direction, the second flange portion is provided with a second welding portion that is welded to the first welding portion on a surface thereof facing the other side in the axial direction, wherein the second housing is provided with a plurality of first reinforcement ribs respectively provided at a plurality of positions in a circumferential direction, each of the plurality of first reinforcement ribs connecting the side wall portion and the second flange portion,
wherein
the second housing is provided with a plurality of gate marks at different positions in the circumferential direction, and
a middle angular position between the gate marks adjacent to each other in the circumferential direction coincides with an angular position of one of the plurality of first reinforcement ribs.

2. The pump device according to claim 1, wherein the plurality of first reinforcement ribs overlaps the second welding portion when viewed from the axial direction.

3. The pump device according to claim 1, wherein the plurality of first reinforcement ribs extends to an outer peripheral edge of the second flange portion.

4. The pump device according to claim 1, wherein
a shape of the side wall portion viewed from the axial direction is a shape that expands radially outward toward one side in the circumferential direction,
the second tubular portion extends from a first angular position at which a distance from the rotation axis to the side wall portion is maximum toward a tangential direction of the side wall portion at the first angular position,
an outer shape of the second flange portion is a circular shape centered on the rotation axis, and
the plurality of first reinforcement ribs respectively extends from an outer peripheral surface of the side wall portion to an outer peripheral edge of the second flange portion at the plurality of positions in the circumferential direction.

5. The pump device according to claim 1, wherein the first housing comprises an attachment portion provided with an attachment surface that abuts on a mating member for attachment.

6. A method of manufacturing the pump device according to claim 5, comprising:
positioning the first housing on a first jig via the attachment portion, and positioning the second housing on a second jig by fitting at least one of the plurality of first reinforcement ribs into a groove provided in the second jig; and
welding the first welding portion and the second welding portion after aligning relative rotational positions of the first housing and the second housing about the rotation axis via the first jig and the second jig.

7. A pump device comprising:
a motor that comprises a rotor and a stator having an annular shape surrounding an outer periphery of the rotor;
a first housing that seals the stator;
a second housing that is put on the first housing from one side in an axial direction along a rotation axis of the rotor to form a pump chamber between the first housing and the second housing; and
an impeller that is disposed in the pump chamber and rotates integrally with the rotor,
wherein
the first housing comprises:
a first partition wall portion that covers the stator on the one side in the axial direction,
a trunk portion that covers an outer periphery of the stator, and
a first flange portion having an annular shape that protrudes from the trunk portion toward an outer peripheral side, the first flange portion is provided with a first welding portion on a surface thereof facing the one side in the axial direction, the second housing comprises:
an end plate portion that is opposed to the first partition wall portion from the one side in the axial direction,
a side wall portion that extends from an outer peripheral edge of the end plate portion toward another side in the axial direction,
a second flange portion having an annular shape that protrudes from the side wall portion toward the outer peripheral side,
a first tubular portion that extends from a center of the end plate portion toward the one side in the axial direction, and
a second tubular portion that extends from the side wall portion toward a direction intersecting the axial direction, the second flange portion is provided with a second welding portion that is welded to the first welding portion on a surface thereof facing the other side in the axial direction,
wherein the second housing is provided with a plurality of first reinforcement ribs respectively provided at a plurality of positions in a circumferential direction, each of the plurality of first reinforcement ribs connecting the side wall portion and the second flange portion;
wherein
a plurality of second reinforcement ribs is respectively provided at a plurality of positions in the circumferential direction at a place where the first tubular portion and the end plate portion are connected,
each of the plurality of second reinforcement ribs connecting the first tubular portion and the end plate portion;
the second housing comprises:
a plurality of support portions that protrudes from an inner peripheral surface of the first tubular portion and extends toward the other side in the axial direction, and
a shaft support portion that is provided at distal ends of the plurality of support portions,
wherein an end portion on the one side in the axial direction of a support shaft that rotatably supports the rotor is supported by the shaft support portion, and
circumferential positions of the plurality of support portions are different from those of the plurality of second reinforcement ribs.

* * * * *